United States Patent
Datz et al.

(10) Patent No.: US 6,645,660 B2
(45) Date of Patent: Nov. 11, 2003

(54) SCREEN-PRINTING PASTE AND SCREEN-PRINTING METHOD OF FABRICATING A GAS DIFFUSION ELECTRODE

(75) Inventors: Armin Datz, Poxdorf (DE); Barbara Schricker, Erlangen (DE); Manfred Waidhas, Nürnberg (DE); Winfried Schaffrath, Dresden (DE); Peter Otschik, Possendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/793,329

(22) Filed: Feb. 26, 2001

(65) Prior Publication Data

US 2002/0022083 A1 Feb. 21, 2002

Related U.S. Application Data

(63) Continuation of application No. PCT/DE99/02620, filed on Aug. 20, 1999.

(30) Foreign Application Priority Data

Aug. 26, 1998 (DE) .......................... 198 38 786

(51) Int. Cl.$^7$ .............................. H07M 4/86; B05D 5/12
(52) U.S. Cl. ............................ 429/42; 429/40; 427/115; 502/101
(58) Field of Search ...................... 429/40, 42; 204/283; 502/101; 427/115, 282; 29/874

(56) References Cited

U.S. PATENT DOCUMENTS

| | | | | |
|---|---|---|---|---|
| 4,229,490 A | * | 10/1980 | Frank et al. | 427/113 |
| 4,568,442 A | * | 2/1986 | Goldsmith | 204/284 |
| 4,892,637 A | * | 1/1990 | Sauer et al. | 204/291 |
| 6,103,077 A | * | 8/2000 | DeMarinis et al. | 204/290.07 |

* cited by examiner

Primary Examiner—Brian K. Talbot
(74) Attorney, Agent, or Firm—Laurence A. Greenberg; Werner H. Stemer; Ralph E. Locher

(57) ABSTRACT

A screen-printing paste as a starting material for fabricating a gas diffusion electrode through screen-printing includes at least one polymer, at least one metallic catalyst, and a high-boiling solvent. The polymer is a binder including poly(butyl acrylate)-polymethacrylate copolymer, a poly (vinyl alcohol), and a poly(ethylene oxide). The polymer can be two polymers, a first being used for hydrophobicization and present in an amount of between 0 to 10% by weight based on a content of the metallic-catalyst, and a second being a binder. A screen-printing method of fabricating the electrode for a fuel cell includes forming a screen-printing layer having a thickness between 3 and 40 μm by applying the screen-printing paste to a base. The solvent and the polymer serve as a screen-printing medium. The screen-printing layer is baked to allow only residues of the solvent and the polymer to remain, which do not interfere with using the electrode in a fuel cell. The method uses a polybutylacrylate-polymethacrylate copolymer as a binder in the screen-printing paste.

10 Claims, No Drawings

SCREEN-PRINTING PASTE AND SCREEN-PRINTING METHOD OF FABRICATING A GAS DIFFUSION ELECTRODE

CROSS-REFERENCE TO RELATED APPLICATION

This application is a continuation of copending International Application No. PCT/DE99/02620, filed Aug. 20, 1999, which designated the United States.

BACKGROUND OF THE INVENTION

FIELD OF THE INVENTION

The invention relates to a screen-printing paste for fabricating a gas diffusion electrode. In addition, the invention also relates to a screen-printing method of fabricating gas diffusion electrodes suitable for fuel cells.

A polymer electrolyte membrane (PEM) fuel cell has, as its core section, membrane-electrode units, each of which is made of a membrane that has on both sides an electrode made of an electrocatalyst layer. The electrode preferably has a solid, gas-permeable and electroconductive support, e.g., carbon fabric or carbon paper, which preferably, for the purpose of hydrophobicization, is hydrophobicized by a polymer suspension. Applied to the support is an electrocatalyst layer that, in turn, is hydrophobicized.

The polymer for the purpose of hydrophobicization is hereinafter referred to as polymer A: this involves polymers such as, e.g., PTFE, i.e., polytetrafluoroethylene, which is known under the trade name TEFLON®. Polymer A can be present both in the support and in the electrocatalyst layer.

The polymer A content required for hydrophobicization of the electrocatalyst layer has hitherto, as a rule, been 20–60% by weight, a high polymer A, e.g., TEFLON®, content having the effect of inhibiting the activity of the platinum catalyst, increasing the contact resistances and reducing the porosity of the electrode (Watanabe, J. Elektroanal. Chem. 195 (1985) 81–83), i.e., having a detrimental effect on the system. The polymer A for the hydrophobicization of the electrocatalyst layer can, therefore, also be described as a "catalyst inhibitor".

With the prior art electrodes there is not only a problem of a high polymer A content for the hydrophobicization of the electrocatalyst layer (20–60% by weight, based on the metallic-catalyst content), but also a problem of the homogeneity of the thickness of the electrocatalyst layer. Accordingly, there is a need to provide a suitable fabrication method that permits uniform coating of the support with dry catalyst powder in small layer thicknesses of 3–40 $\mu$m in a cost-effective manner suitable for large-scale production.

According to a conventional method (Watanabe, J. Electroanal. Chem. 195 (1985) 81–83; J. Electroanal. Chem. 197 (1986) 195–208, M. Uchida, J. Electrochem. Soc. 142 (1995), 463–468), a dry powdered mixture of catalyst powder hydrophobicized beforehand with PTFE is pressed onto the likewise hydrophobicized support. To prepare the starting material, the carbon powder is first mixed intensively with the PTFE dispersion and is then dried above a temperature of 280° C. In the process, the surface-active wetting agent (Triton X 100) present in the dispersion is removed. The wetting agent is employed to counterbalance the poor processing characteristics resulting from the high polymer A content in the catalyst paste. Then the mixture is powdered.

The latter method is laborious, and a uniform thickness of the electrocatalyst layer in small layer thicknesses can be achieved only at the expense of low productivity and is subject to technical difficulties. Other drawbacks of the method include:

a high polymer A content being present to hydrophobicize the electrocatalyst layer; and the addition of a wetting agent for processing purposes having to be removed separately and leaving troublesome residues.

Screen-printing is a conventional technique for fabricating a uniformly thin layer. A screen-printing method for building up an electrochemical system is in the prior art. According to U.S. Pat. No. 4,229,490 to Frank et al., the screen-printing paste, which contains a TEFLON® dispersion, graphite, and platinum black, must again, for stabilization purposes, be admixed with more than 50% by weight of the wetting agent or dispersant "Triton X 100". The TEFLON® fraction employed for hydrophobicization in the screen-printing paste and, consequently, also the proportion present in the resulting electrocatalyst layer is about 25% by weight. The paste is printed onto a solid support, e.g., carbon paper, which again contains 60% by weight of TEFLON®. The process results in a total TEFLON® content of about 85%. The electrode fabricated by such a method not only has the drawback of the high polymer A content in order to hydrophobicize the electrocatalyst layer, but also the drawback of the wetting agent added in an amount of more than 50% by weight of the catalyst paste.

In addition, International PCT publication WO 96/29752 A1 discloses a cation exchange membrane that has polymers and further fillers. The membrane is claimed to be directly suitable for a reaction using methanol as a fuel.

SUMMARY OF THE INVENTION

It is accordingly an object of the invention to provide a screen-printing paste and screen-printing method of fabricating a gas diffusion electrode that overcomes the hereinafore-mentioned disadvantages of the heretofore-known devices and methods of this general type.

With the foregoing and other objects in view, there is provided, in accordance with the invention, a screen-printing paste as a starting material for fabricating a gas diffusion electrode through screen-printing, including at least one polymer, the at least one polymer being at least one binder selected from the group consisting of a poly(butyl acrylate)-polymethacrylate copolymer, a poly(vinyl alcohol), and a poly(ethylene oxide). The paste also includes at least one metallic catalyst and a high-boiling solvent.

In accordance with another feature of the invention, the at least one polymer is two polymers. A first of the two polymers is used for hydrophobicization and is present in an amount of between 0 to 10% by weight based on a content of the at least one metallic-catalyst, and a second of the two polymers is a binder.

With the objects of the invention in view, there is also provided a screen-printing method of fabricating a gas diffusion electrode for a fuel cell, including the step of providing a screen-printing paste having at least one polymer, at least one metallic catalyst, and a high-boiling solvent. The at least one polymer is at least one binder selected from the group consisting of a poly(butyl acrylate)-polymethacrylate copolymer, a poly(vinyl alcohol), and a poly(ethylene oxide). A screen-printing layer having a thickness between 3 and 40 $\mu$m is formed by applying the screen-printing paste to a base, the high-boiling solvent and the at least one polymer serving as a screen-printing medium for ensuring uniformity of the screen-printing layer. The screen-printing layer is baked to allow only residues of one of the high-boiling solvent and the at least one polymer to remain in the screen-printing layer, such residues not interfering with use of the gas diffusion electrode in a fuel cell.

In accordance with a further mode of the invention, the at least one polymer is two polymers. A first of the two polymers is present in an amount of between 0 to 10% by weight based on a content of the at least one metallic-catalyst, and a second of the two polymers is a binder. Hydrophobicization is effected with the first of the two polymers.

In accordance with an added mode of the invention, the hydrophobicization is effected in a screen-printing operation with the first of the two polymers.

In accordance with a concomitant mode of the invention, hydrophobicization is effected with the at least one polymer in a separate procedural step after a screen-printing operation.

According to the invention, the screen-printing paste, as well as with the metallic catalyst and the high-boiling solvent, is admixed with a polymer B, specifically, in particular, a polymer that can be baked out at up to 400° C. An example of such a polymer B is a poly(butyl acrylate)-polymethacrylate copolymer, although poly(vinyl alcohol) or poly(ethylene oxide) or mixtures of these substances are possible as the polymer B. In contrast, the screen-printing paste according to the invention does not contain any proportion of polymer A or only a proportion that is decisively reduced compared with the prior art. The proportion by weight can be limited, in the gas diffusion electrode fabricated according to the inventive method, to at most 10% by weight.

In the screen-printing paste according to the invention, the metallic catalyst, as in the prior art, is platinum black or platinum on carbon. The high-boiling solvent used includes an ester and/or a ketone and/or an alcohol, in particular, preferably butyl glycolate, cyclohexanone, and/or terpineol.

The invention implements a screen-printing method of fabricating a gas diffusion electrode employing a screen-printing paste that includes polymer A in an amount of from 0% to at most 10% by weight, based on the metallic-catalyst content, at least one metallic catalyst and a high-boiling solvent. Thus, the screen-printing paste is free from wetting agent and is either also free from polymer A or contains polymer A only in small amounts of less than 10% by weight, based on the metallic-catalyst content. The polymer B, in contrast, is removed by the baking-out procedure such that no residues remain that would interfere with the use as a gas diffusion electrode.

Other features that are considered as characteristic for the invention are set forth in the appended claims.

Although the invention is described herein as embodied in a screen-printing paste and screen-printing method of fabricating a gas diffusion electrode, it is, nevertheless, not intended to be limited to the details given because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying examples.

DESCRIPTION OF THE PREFERRED EMBODIMENTS

Further details and advantages of the invention can be gathered from the following description of illustrative embodiments in conjunction with the claims. Described herein is a fabrication of a gas diffusion electrode for use in a fuel cell, which includes a support, an electrocatalyst layer, and a suitable hydrophobicization.

Referred to as the electrocatalyst layer is a layer that is preferably applied to a solid, gas-permeable, and electroconductive support of the electrode and at whose catalytic surface the anodic oxidation of the fuel to produce protons or the cathodic reduction of the oxygen takes place. The electrocatalyst layer includes at least the metallic catalyst, which preferably includes platinum and that can be employed in the catalyst paste either in pure form as platinum black or in dilute form as platinum on carbon. Preferably, the electrocatalyst layer contains no further constituents because, according to the preferred embodiment of the invention, the screen-printing medium admixed to the catalyst paste for processing purposes was removed by drying and heating of the finished, i.e., coated electrode.

For processing purposes, the screen-printing paste, also referred to as carbon paste or catalyst paste, depending on the process step, is admixed with a high-boiling solvent as a screen-printing medium, such as, e.g., an ester, ketone, and/or an alcohol, especially butyl glycolate, cyclohexanone, and/or terpineol. However, the screen-printing paste involves not only—as disclosed in the prior art—the admixture of a high-boiling solvent as a screen-printing medium, but also that of a polymer B, such as, e.g., poly(butyl acrylate)-poly(methyl acrylate)copolymer, poly (vinyl alcohol), and/or poly(ethylene oxide), as a binder. The polymer B can preferably be baked out, particularly at temperatures up to 400° C., and/or only leaves residues that do not interfere with fuel cell operation.

The electrode is a gas-permeable, electroconductive layer on the membrane, which preferably includes a support with an electrocatalyst layer. The support or substrate used is preferably a carbon fabric or a carbon paper or some other porous, electroconductive substrate.

The platinum loading determined by weighing is 2–3 $mg/cm^2$ in the case of pure platinum black as the catalyst, and is from 0.15 to 0.4 $mg/cm^2$ in the case of platinum on carbon as a catalyst, depending on the platinum loading of the carbon.

In the course of fabricating the gas diffusion electrode, the screen-printing procedure and subsequent processing is followed by the finished electrode being hydrophobicized with a polymer A (e.g., TEFLON®).

Current-voltage curves of membrane-electrode units including gas diffusion electrodes according to the invention were performed in which an extraordinarily low voltage drop at high current intensities could be observed. The effect can be ascribed, inter alia, to the low diffusion inhibition due to the low polymer A content and detriment to the hydrophobicization by wetting agent residues within the porous electrocatalyst layer.

A particular advantage of the screen-printing method implemented with the screen-printing paste described is the improved homogeneity of the layer thickness due to the electrocatalyst paste with the small addition or without the addition of polymer A being able to be processed more easily.

We claim:

1. A screen-printing method of fabricating a gas diffusion electrode for a fuel cell, which comprises:
   providing a screen-printing paste having:
   at least one polymer, the at least one polymer being at least one binder selected from the group consisting of a poly(butyl acrylate)-polymethacrylate copolymer, a poly(vinyl alcohol), and a poly(ethylene oxide);

at least one metallic catalyst; and a high-boiling solvent;

forming a screen-printing layer having a thickness between 3 and 40 μm by applying the screen-printing paste to a base, the high-boiling solvent and the at least one polymer serving as a screen-printing medium for ensuring uniformity of the screen-printing layer; and baking the screen-printing layer to allow only residues of one of the high-boiling solvent and the at least one polymer to remain in the screen-printing layer, such residues not interfering with use of the gas diffusion electrode in a fuel cell.

2. The screen-printing method according to claim 1, wherein the at least one polymer is two polymers, a first of the two polymers is present in an amount of less than 10% by weight based on a content of the at least one metallic-catalyst, and a second of the two polymers is a binder, and which further comprises effecting hydrophobicization with the first of the two polymers.

3. The method according to claim 2, which further comprises performing the effecting step by effecting hydrophobicization in a screen-printing operation with the first of the two polymers.

4. The method according to claim 1, which further comprises effecting the hydrophobization with the at least one polymer in a separate procedural step after a screen-printing operation.

5. A screen-printing paste as a starting material for fabricating a gas diffusion electrode through screen-printing, comprising:

a poly(butyl acrylate)-polymethacrylate copolymer binder;

at least one metallic catalyst; and a high-boiling solvent.

6. The screen-printing paste according to claim 5 further comprising a second polymer selected from the group consisting of a poly(vinyl alcohol) and a poly(ethylene oxide), a first of said two polymers being used for hydrophobicization and being present in an amount of less than 10% by weight based on a content of said at least one metallic-catalyst, and a second of said two polymers being a binder.

7. A screen-printing method of fabricating a gas diffusion electrode for a fuel cell, which comprises:

providing a screen-printing paste having:

a poly(butyl acrylate)-polymethacrylate copolymer binder;

at least one metallic catalyst; and a high-boiling solvent;

forming a screen-printing layer having a thickness between 3 and 40 μm by applying the screen-printing paste to a base, the high-boiling solvent and the at least one polymer serving as a screen-printing medium for ensuring uniformity of the screen-printing layer; and baking the screen-printing layer to allow only residues of one of the high-boiling solvent and the at least one polymer to remain in the screen-printing layer, such residues not interfering with use of the gas diffusion electrode in a fuel cell.

8. The screen-printing method according to claim 7, which further comprises selecting a second polymer from the group consisting of a poly(vinyl alcohol) and a poly(ethylene oxide), a first of the two polymers being present in an amount of less than 10% by weight based on a content of the at least one metallic-catalyst, and a second of said two polymers being a binder effecting hydrophobicization with the first of the two polymers.

9. The method according to claim 8, which further comprises performing the effecting step by effecting hydrophobicization in a screen-printing operation with the first of the two polymers.

10. The method according to claim 7, which further comprises effecting the hydrophobization with the at least one polymer in a separate procedural step after a screen-printing operation.

* * * * *